(12) United States Patent
Wu

(10) Patent No.: US 6,789,334 B2
(45) Date of Patent: Sep. 14, 2004

(54) PUNCH-TO-FIX STRUCTURE OF STEEL-HEAD SHOES

(76) Inventor: Chien-I Wu, No. 29, Alley 120, Lane 29, Lung-Tung Road, Chung-Li City, Tao-Yuan Hsien (TW)

(*) Notice: Subject to any disclaimer, the term of this patent is extended or adjusted under 35 U.S.C. 154(b) by 51 days.

(21) Appl. No.: 10/357,947

(22) Filed: Feb. 3, 2003

(65) Prior Publication Data

US 2004/0148798 A1 Aug. 5, 2004

(51) Int. Cl.[7] ............................................. A43C 13/14
(52) U.S. Cl. ......................................... 36/77 R; 36/24
(58) Field of Search ........................... 36/77 R, 24, 15, 36/101, 23

(56) References Cited

U.S. PATENT DOCUMENTS

| | | | | |
|---|---|---|---|---|
| 2,183,277 A | * | 12/1939 | Heilhecker | ................... 36/101 |
| 3,073,042 A | * | 1/1963 | Deitch | ............................ 36/15 |
| 3,191,321 A | * | 6/1965 | Brutting | ...................... 36/77 R |
| 4,348,820 A | * | 9/1982 | D'Alessio | ..................... 36/101 |
| 4,811,501 A | * | 3/1989 | Okayasu | ...................... 36/77 R |

* cited by examiner

Primary Examiner—Ted Kavanaugh

(57) ABSTRACT

A punch-to-fix structure of steel-head shoes comprises a vamp, a steel head, and a sole, in which a covering portion and a wearing entrance are formed at a front and a rear end of the vamp, respectively. The bottom end of the vamp is an upper jointing mouth having a plurality of peripherally punched through holes, and there is also a plurality of through holes formed surrounding the steel head. The top end of the sole is a lower jointing mouth surrounded by a plurality of protruding dots corresponding to the through holes in the steel head and the upper jointing mouth of the vamp. When assembling, the protruding dots along the perimeter in the lower jointing mouth of the sole are squeezed into the through holes of the covering portion in the upper jointing mouth and into the through holes of the steel head to thereby combine the steel head, the vamp, and the sole solidly together.

3 Claims, 4 Drawing Sheets

PUNCH-TO-FIX STRUCTURE OF STEEL-HEAD SHOES

FIELD OF THE INVENTION

This invention relates to a punch-to-fix structure of steel-head shoes, more specifically, it relates to a fixing structure for setting up a steel head at the front end of a shoe's vamp and sole. In forming a sole by way of injection, a number of peripheral protruding dots of the sole will be squeezed to enter corresponding preformed through holes in a lower circumference of a vamp placed in a mold to thereby combine the vamp with the sole rapidly and intensify the joint thereof.

BACKGROUND OF THE INVENTION

As shown in FIG. 4, the parts concerned to a punch-to-fix structure of the conventional steel-head shoes includes a vamp (4), a steel head (5), and a sole (6), in which the vamp (4) has a covering portion (41) at its front part and a bottom part as an upper jointing mouth (42); the steel head (5) has a plurality of through holes (51) circularly arranged in its front arcuate portion; and the sole (6) to be formed by injection has a top part as a lower jointing mouth.

When assembling, the procedure is first to place the steel head (5) in the covering portion (41) (a box toe) of the vamp (4), then seam the through holes (51) of the steel head (5) with a stitch (7) to fix the steel head (5) in the covering portion (41) of the vamp (4), and finally, combine the injection-molded sole (6) with the vamp (4) by sleeve-jointing the lower jointing mouth of the sole (6) to the upper jointing mouth (42) of the vamp (4) and apply binder to enhance the joint to complete the job.

According to above-described conventional structure, a stitch is employed to pass through the through holes circularly formed in the steel head repetitiously to fix the steel head in the front covering portion of the vamp, however, one thing for sure is that the seamed stitch will be eroded and ruptured sooner or later to result in a detachment of the steel head from the vamp.

Moreover, as the injection-molded sole is in lack of a preventive measure to avoid an unglued phenomenon at the jointing boundary between the upper jointing mouth of the vamp and the lower jointing mouth of the sole, therefore, a detachment of the vamp and the sole may occur in advance after undergoing some bad weather tests.

SUMMARY OF THE INVENTION

The primary objective of this invention is to provide a punch-to-fix structure of steel-head shoes for eliminating the defect of detachment of a steel head from a covering portion in a conventional seamed structure.

Another objective of this invention is to provide a punch-to-fix structure of steel-head shoes for improving the defect of ungluing phenomenon between the vamp and the sole in a conventional binding structure of shoes.

In order to realize abovesaid objectives, this invention shall comprise a vamp, a steel head, and a sole, in which a covering portion and a wearing entrance are formed at a front and a rear end of the vamp, respectively. The bottom end of the vamp is an upper jointing mouth having a plurality of peripherally punched through holes, and there is also a plurality of through holes formed surrounding the steel head. The top end of the sole is a lower jointing mouth surrounded by a plurality of protruding dots corresponding to the through holes in the steel head and the upper jointing mouth of the vamp. The assembling procedure is first to place the steel head in the covering portion of the vamp and arrange the annular through holes in the steel head flush to the corresponding through holes in the covering portion of the vamp, then place the vamp together with the steel head in mold and form the sole by pouring and injection method. At this time, the protruding dots along the perimeter in the lower jointing mouth of the sole are squeezed into the through holes of the covering portion in the upper jointing mouth and into the through holes of the steel head to thereby combine the steel head, the vamp, and the sole together.

The merits of this invention could be summarized in the following:

1. A measure for preventing ungluing of the upper and the lower jointing mouth by forming through holes and protruding dots is offered to solidly combine the vamp, the steel head, and the sole together;
2. As this invention needs neither stitches no binder for combining the vamp, the steel head, and the sole together, the erosion of stitches or unglue of binder can be avoided; and
3. Because the combination of the vamp, the steel head, and the sole is made by an integral injection molding process, time of manufacture can be significantly shortened.

For more detailed information regarding advantages or features of this invention, at least an example of preferred embodiment will be fully described below with reference to the annexed drawings.

BRIEF DESCRIPTION OF THE DRAWINGS

The related drawings in connection with the detailed description of this invention to be made later are described briefly as follows, in which.

DETAILED DESCRIPTION OF THE INVENTION

Figure 1:
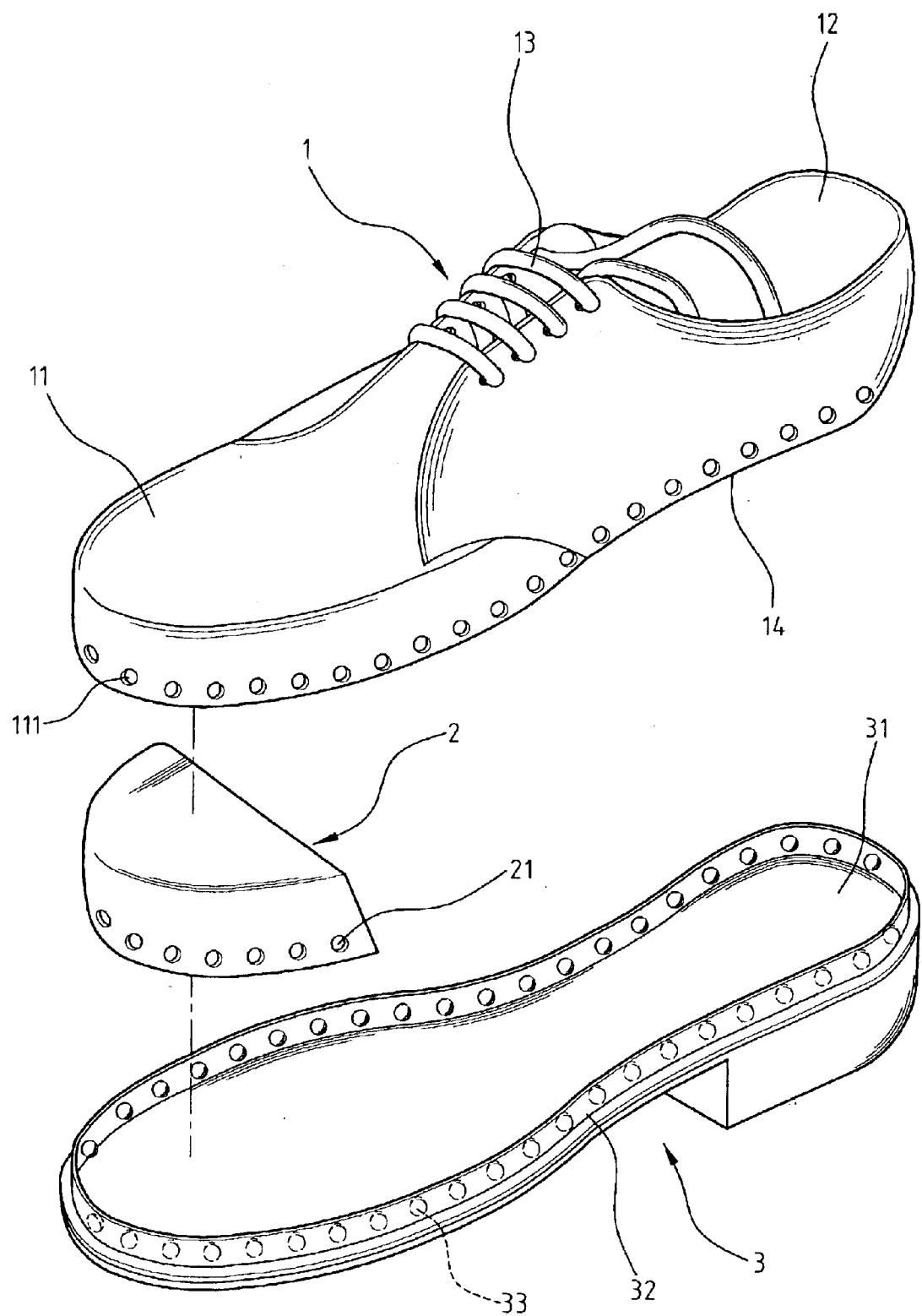
FIG. 1 is a three-dimensional exploded view of this invention.

As illustrated in FIG. 1, a punch-to-fix structure of steel-head shoes of this invention comprises a vamp (1), a steel head (2), and a sole (3).

A covering portion (11) and a wearing entrance (12) are formed at a front and a rear end of the vamp (1), respectively, in which a shoelace (13) is fastened in front of the wearing entrance (12). The bottom end of the vamp (1) is an upper jointing mouth (14), which includes the covering portion (11) having a plurality of peripherally punched through holes (111).

There is also a plurality of through holes (21) formed in the steel head (2) peripherally, in which the through holes (21) corresponding to the through holes (111) in the covering portion (11) are uniformly punched and spaced in an interval about 10–15 mm and preferably with a diameter of 4 mm.

The sole (3) is integrally formed by way of injection molding with plastic material, such as polyurethane (PU) or polyvinyl chloride (PVC). A lower jointing mouth (31) is formed on the top end of the sole (3). The lower jointing mouth (31) is substantially a peripheral perimeter (32) of the sole (3) corresponding to the perimeter of the upper jointing mouth (14) of the vamp (1), and enclosing a plurality of protruding dots (33) corresponding to the through holes (111) of the covering portion (11) and the through holes (21) of the steel head (2).

Figure 2:
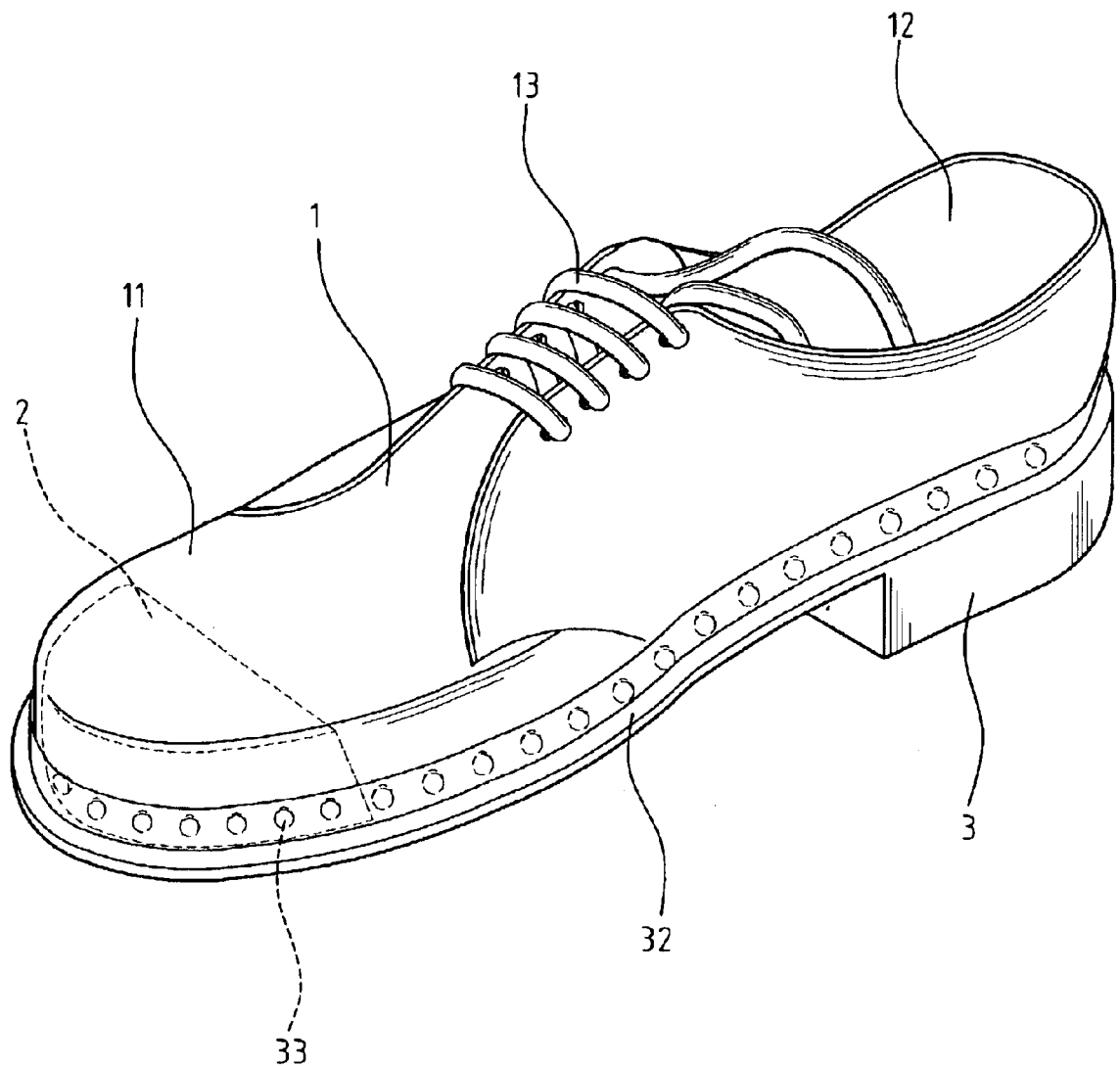
FIG. 2 is a three-dimensional assembled view of this invention.
Figure 3:
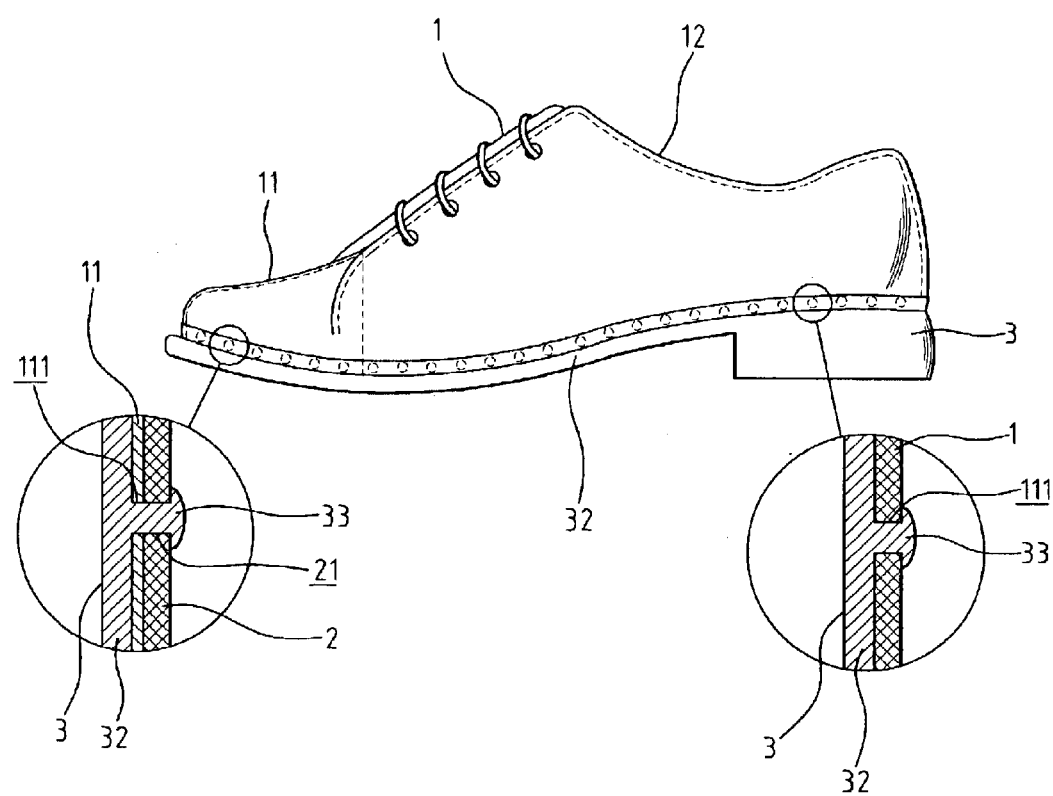
FIG. 3 is an enlarged plane-sectional view showing the combination of the front protruding dots of the sole and the through holes formed in the steel head shown in FIG. 2.
Figure 4:
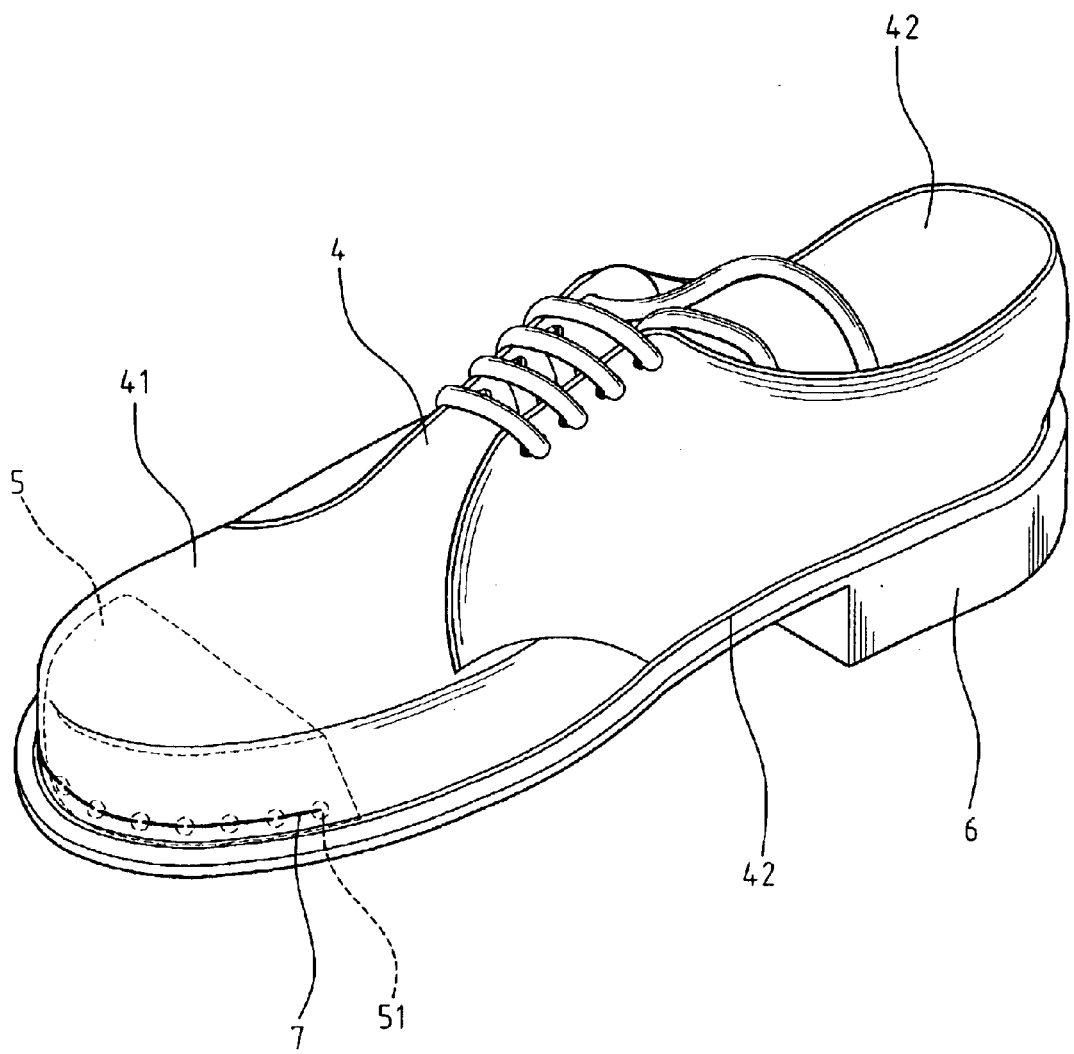
FIG. 4 is a schematic assembling view in three dimensions showing the combination of the through holes in a steel head and the front perimeter of a sole in a conventional shoe.

Referring to FIGS. 2 and 3 (also to FIG. 1), for assembling a steel-head shoe, the procedure is to first place the steel head (2) in the covering portion (11) of the vamp (1) and arrange the annular through holes (21) in the steel head (2) flush to the corresponding through holes (111) in the covering portion (11) of the vamp (1), then place the vamp (1) together with the steel head (2) in mold and form the sole (3) by pouring and injection method. At this time, the protruding dots (33) along the perimeter (32) in the lower jointing mouth (32) of the sole (3) are meanwhile squeezed into the through hole (111) of the covering portion (11) in the upper jointing mouth (14) and the through holes (21) of the steel head (2) to thereby combine the steel head (2), the vamp (1), and the sole (3) together firmly.

In the above described, at least one preferred embodiment has been described in detail with reference to the drawings annexed, and it is apparent that numerous changes or modifications may be made without departing from the true spirit and scope thereof, as set forth in the claims below.

What is claimed is:

1. A punch-to-fix structure of steel-head shoes, comprising a vamp, a steel head, and a sole, in which a covering portion is formed at a front end of said vamp and the bottom end of said vamp is substantially an upper jointing mouth having a plurality of through holes (111) along its perimeter; a plurality of through holes (21) is also formed in said steel head peripherally at positions corresponding to the through holes (111) of the covering portion; and the top end of said sole is a lower jointing mouth having a plurality of protruding dots in its perimeter at positions corresponding to the through holes in the upper jointing mouth of said vamp and in said steel head.

2. The structure according to claim 1, in which said protruding dots in the sole are squeezed into the through holes in the upper jointing mouth of the vamp and in the steel head respectively by an integral injection molding process.

3. The structure according to claim 2, in which the material applied in the injection molding process is polyurethane (PU) or polyvinyl chloride (PVC).

* * * * *